US010064335B2

(12) United States Patent
Byttebier et al.

(10) Patent No.: US 10,064,335 B2
(45) Date of Patent: Sep. 4, 2018

(54) UNLOADING SYSTEMS (71) Applicant: CNH Industrial America LLC, New Holland, PA (US)

(72) Inventors: Ward M. R. Byttebier, Zwevegem (BE); Bernard E. D. Depestel, Oedelem (BE); Pieter Vanysacker, Moere (BE); Karel M. C. Viaene, Moorslede (BE)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/030,800

(22) PCT Filed: Oct. 28, 2014

(86) PCT No.: PCT/EP2014/073106
§ 371 (c)(1),
(2) Date: Apr. 20, 2016

(87) PCT Pub. No.: WO2015/063078
PCT Pub. Date: May 7, 2015

(65) Prior Publication Data
US 2016/0249533 A1 Sep. 1, 2016

(30) Foreign Application Priority Data

Oct. 28, 2013 (BE) .................................. 2013/0725

(51) Int. Cl.
*A01D 90/10* (2006.01)
*A01D 90/12* (2006.01)
(Continued)

(52) U.S. Cl.
CPC ........... *A01D 90/10* (2013.01); *A01D 43/087* (2013.01); *A01D 90/12* (2013.01); *B65G 67/24* (2013.01)

(58) Field of Classification Search
CPC ...... A01D 90/10; A01D 43/087; A01D 90/12; B65G 67/24
See application file for complete search history.

(56) References Cited

U.S. PATENT DOCUMENTS 4,042,132 A 8/1977 Bohman et al.
4,376,609 A 3/1983 Bohman et al.
(Continued)

FOREIGN PATENT DOCUMENTS

EP 1219153 A2 7/2002
EP 1219159 A1 7/2002
(Continued)

OTHER PUBLICATIONS

PCT/EP2014/073106, International Search Report, dated Jan. 19, 2015, 3 pages.
(Continued)

*Primary Examiner* — Tuan C To
(74) *Attorney, Agent, or Firm* — Patrick M. Sheldrake; Peter K. Zacharias (57) ABSTRACT A controller for an unloading system. The unloading system comprises an unloading vehicle having an unloading apparatus and a collection vehicle having a container. The unloading apparatus is configured to direct material to the container driven in the vicinity of the unloading vehicle. The controller is configured to: receive image data representative of at least a portion of the container; receive a path information signal representative of a path that is to be followed by the unloading vehicle or the collection vehicle; and set an attribute of the unloading apparatus, the unloading vehicle, or the collection vehicle in accordance with the image data and the path information signal in order to direct the material from the unloading apparatus to the container.

16 Claims, 2 Drawing Sheets (51) Int. Cl.
*B65G 67/24* (2006.01)
*A01D 43/08* (2006.01)

(56) References Cited

U.S. PATENT DOCUMENTS

| | | | |
|---|---|---|---|
| 5,575,316 | A | 11/1996 | Pollklas |
| 5,749,783 | A | 5/1998 | Pollklas |
| 6,247,510 | B1 | 6/2001 | Diekhans et al. |
| 6,587,772 | B2 | 7/2003 | Behnke |
| 6,943,824 | B2 | 9/2005 | Alexia et al. |
| 7,537,519 | B2 | 5/2009 | Huster et al. |
| 7,756,624 | B2 | 7/2010 | Diekhans et al. |
| 8,145,393 | B2 | 3/2012 | Foster et al. |
| 8,234,047 | B2 | 7/2012 | Madsen et al. |
| 8,428,829 | B2 | 4/2013 | Brunnert et al. |
| 8,451,139 | B2 | 5/2013 | Morselli et al. |
| 8,499,537 | B2 | 8/2013 | Correns et al. |
| 8,606,454 | B2 | 12/2013 | Wang et al. |
| 8,682,540 | B2 | 3/2014 | Missotten et al. |
| 8,868,304 | B2 | 10/2014 | Bonefas |
| 8,909,389 | B2 | 12/2014 | Meyer |
| 9,014,901 | B2 | 4/2015 | Wang et al. |
| 9,107,344 | B2 | 8/2015 | Madsen et al. |
| 2005/0197175 | A1* | 9/2005 | Anderson ............ A01B 69/008 460/1 |
| 2005/0197844 | A1* | 9/2005 | Ng .................. G06Q 10/08 705/333 |
| 2006/0081782 | A1* | 4/2006 | Guillebaud .......... G01V 5/0083 250/360.1 |
| 2009/0044505 | A1 | 2/2009 | Huster et al. |
| 2010/0110185 | A1* | 5/2010 | Tafazoli Bilandi .... H04N 7/183 348/143 |
| 2010/0298994 | A1* | 11/2010 | Mitchell ............ A01M 7/0089 700/283 |
| 2011/0066337 | A1* | 3/2011 | Kormann ............ A01D 43/073 701/50 |
| 2012/0263560 | A1 | 10/2012 | Diekhans et al. |
| 2012/0265412 | A1 | 10/2012 | Diekhans et al. |
| 2012/0302299 | A1* | 11/2012 | Behnke ................ A01B 69/008 460/6 |
| 2013/0211658 | A1* | 8/2013 | Bonefas ............... B65G 67/24 701/28 |
| 2013/0227922 | A1 | 9/2013 | Zametzer et al. |
| 2013/0316737 | A1 | 11/2013 | Guba et al. |
| 2014/0009612 | A1* | 1/2014 | King ..................... B66F 9/0755 348/143 |
| 2014/0083556 | A1* | 3/2014 | Darr ..................... A01D 43/073 141/1 |
| 2014/0224377 | A1* | 8/2014 | Bonefas ............... A01D 43/073 141/1 |
| 2014/0350801 | A1 | 11/2014 | Bonefas |

FOREIGN PATENT DOCUMENTS

| | | | |
|---|---|---|---|
| EP | 1574122 | A1 | 9/2005 |
| EP | 2146307 | A2 | 1/2010 |
| EP | 2452551 | A2 | 5/2012 |
| EP | 2561746 | A1 | 2/2013 |
| EP | 2564683 | A1 | 3/2013 |

OTHER PUBLICATIONS

PCT/EP2014/073106, International Written Opinion, dated Jan. 19, 2015, 4 pages.

* cited by examiner

UNLOADING SYSTEMS

CROSS REFERENCE TO RELATED APPLICATIONS

This application is the National Stage of International Application No. PCT/EP2014/073106 filed on Oct. 28, 2014, which claims priority to Belgian Application No. 2013/0725 filed Oct. 28, 2013, each of which applications is incorporated herein by reference in its entirety.

FIELD OF THE INVENTION

The present disclosure relates to unloading systems that include an unloading vehicle such as a forage harvester or a combine harvester, and in particular to controllers for such unloading systems.

BACKGROUND OF THE INVENTION

In forage harvesters of the above type, control of the spout position and of the position of a pivotable end portion (flap) of the spout on the basis of camera images is known in the art. Patent publication WO-A-2011/101458 describes a system in which a 3D camera is arranged on the discharge spout. The camera takes images of the container driving next to the machine. These images define at least two vertical strips. Analysis of these strips provides the position of the front and/or rear wall of the container relative to the camera. Based on this information, the spout is controlled so that the crop material is unloaded in the container.

Patent publication WO-A-2013/120079 A1 shows a system using the images from two cameras to align the spout with a target zone of the container. This may be achieved by repositioning the spout and or changing the speed of the harvester. These prior art systems react to changes in the actual images and may not always have sufficient time for realigning the spout when one or more harvesting or field conditions suddenly change, such that some crop may be lost.

SUMMARY OF THE INVENTION

According to a first aspect of the invention, there is provided a controller for an unloading system, the unloading system comprising (i) an unloading vehicle having an unloading apparatus and (ii) a collection vehicle having a container, wherein the unloading apparatus is configured to direct material to the container driven in the vicinity of the unloading vehicle, and wherein the controller is configured to:
receive image data representative of at least a portion of the container;
receive a path information signal representative of a path that is to be followed by the unloading vehicle or the collection vehicle; and
set an attribute of the unloading apparatus, unloading vehicle and/or collection vehicle in accordance with the image data and the path information signal.

In this way, the unloading system can be automatically controlled such that characteristics of the path that will affect the unloading of material, can be taken into account quickly and efficiently when directing the material from the unloading apparatus to the container. This enables modulation of the setting of the attribute in a proactive way, before the changes in relative movement between the unloading and unloading vehicles caused by a feature of the upcoming path show from the image data. This can reduce spillage of the material from the container.

The controller may be further configured to:
process the path information signal in order to determine a relative positioning characteristic representative of how the unloading apparatus will move relative to the container as the unloading vehicle or collection vehicle follows the path; and
set an attribute of the unloading apparatus, unloading vehicle and/or collection vehicle in accordance with the image data and the relative positioning characteristic.

The path information signal may be representative of the location of a predetermined path that is to be followed by the unloading vehicle or the collection vehicle. The predetermined path may be a series of GPS coordinates.

The path information signal may be representative of the location of material that is to be collected by the unloading vehicle.

There may be provided an unloading system comprising a controller as disclosed herein; and a material location sensor configured to detect the location of material that is to be collected in order to provide the path information signal.

The path information signal may include an indication of an upcoming turn. The controller may be configured to direct the material from the unloading apparatus to a different region of the container in advance of the turn.

The controller may be configured to direct the material from the unloading apparatus to a region of the container that is either further forwards or backwards (relative to the direction of travel of the unloading vehicle) in advance of the turn.

The path information signal may be representative of the amount of material per unit area that is to be collected.

There may be provided an unloading system comprising a controller as disclosed herein; and a material amount sensor configured to detect the amount of material that is to be collected in order to provide the path information signal.

The controller may be configured to:
increase the speed of the collection vehicle and/or set an attribute of the unloading apparatus in order to direct the material from the unloading apparatus to a region of the container that is further forwards, if the path information signal is indicative of a reducing amount of material that is to be collected, and/or
decrease the speed of the collection vehicle and/or set an attribute of the unloading apparatus in order to direct the material from the unloading apparatus to a region of the container that is further backwards, if the path information signal is indicative of an increasing amount of material that is to be collected.

The path information signal may be representative of the slope of a predetermined path that is to be followed by the unloading vehicle.

The image data may comprise 3-dimensional image data.

The attribute of the unloading apparatus may comprise one or more of an angular position of the unloading apparatus about a vertical axis, an angular position of the unloading apparatus about a horizontal axis and an angular position of a pivotable flap at a distal end of the unloading apparatus. The attribute of the collection vehicle may be speed and/or direction.

There may be provided an agricultural harvesting machine comprising:
an unloading apparatus, and
any controller disclosed herein.

According to a further aspect of the invention, there is provided a method of controlling an unloading system, the unloading system comprising (i) an unloading vehicle having an unloading apparatus and (ii) a collection vehicle having a container, wherein the container is driven in the vicinity of the unloading vehicle, the method comprising:

receiving image data representative of at least a portion of the container;

receiving a path information signal representative of a path that is to be followed by the unloading vehicle or the collection vehicle; and setting an attribute of the unloading apparatus, unloading vehicle and/or collection vehicle in accordance with the image data and path information signal.

The method may further comprise:

processing the path information signal in order to determine a relative positioning characteristic representative of how the unloading apparatus will move relative to the container as the unloading vehicle or collection vehicle follows the path; and setting an attribute of the unloading apparatus, unloading vehicle and/or collection vehicle in accordance with the image data and the relative positioning characteristic.

The method may comprise directing the material from the unloading apparatus to a different region of the container (which may be either further forwards or further backwards) in advance of an upcoming turn.

The method may comprise increasing the speed of the collection vehicle and/or setting an attribute of the unloading apparatus in order to direct the material from the unloading apparatus to a region of the container that is further forwards, if the path information signal is indicative of a reducing amount of material that is to be collected.

The method may comprise decreasing the speed of the collection vehicle and/or setting an attribute of the unloading apparatus in order to direct the material from the unloading apparatus to a region of the container that is further backwards, if the path information signal is indicative of an increasing amount of material that is to be collected.

There may be provided a controller for an unloading system, the unloading system comprising (i) an unloading vehicle having an unloading apparatus and (ii) a collection vehicle having a container, wherein the unloading apparatus is configured to direct unloaded material to the container driven in the vicinity of the unloading vehicle, and wherein the controller is configured to:

receive image data representative of at least a portion of the container;

receive a slope signal from a slope sensor associated with the unloading vehicle or collection vehicle; and set an attribute of the unloading apparatus and/or collection vehicle in accordance with the image data and slope signal in order to direct the material from the unloading apparatus to the container.

There may be provided a computer program, which when run on a computer, causes the computer to configure any apparatus, including a controller, unloading system and agricultural harvesting machine disclosed herein or perform any method disclosed herein. The computer program may be a software implementation, and the computer may be considered as any appropriate hardware, including a digital signal processor, a microcontroller, and an implementation in read only memory (ROM), erasable programmable read only memory (EPROM) or electronically erasable programmable read only memory (EEPROM), as non-limiting examples.

The computer program may be provided on a computer readable medium, which may be a physical computer readable medium such as a disc or a memory device, or may be embodied as a transient signal. Such a transient signal may be a network download, including an internet download.

BRIEF DESCRIPTION OF THE DRAWINGS

Embodiments of the present invention will now be described by way of example and with reference to the accompanying drawings in which.

DETAILED DESCRIPTION OF THE INVENTION

Figure 1:
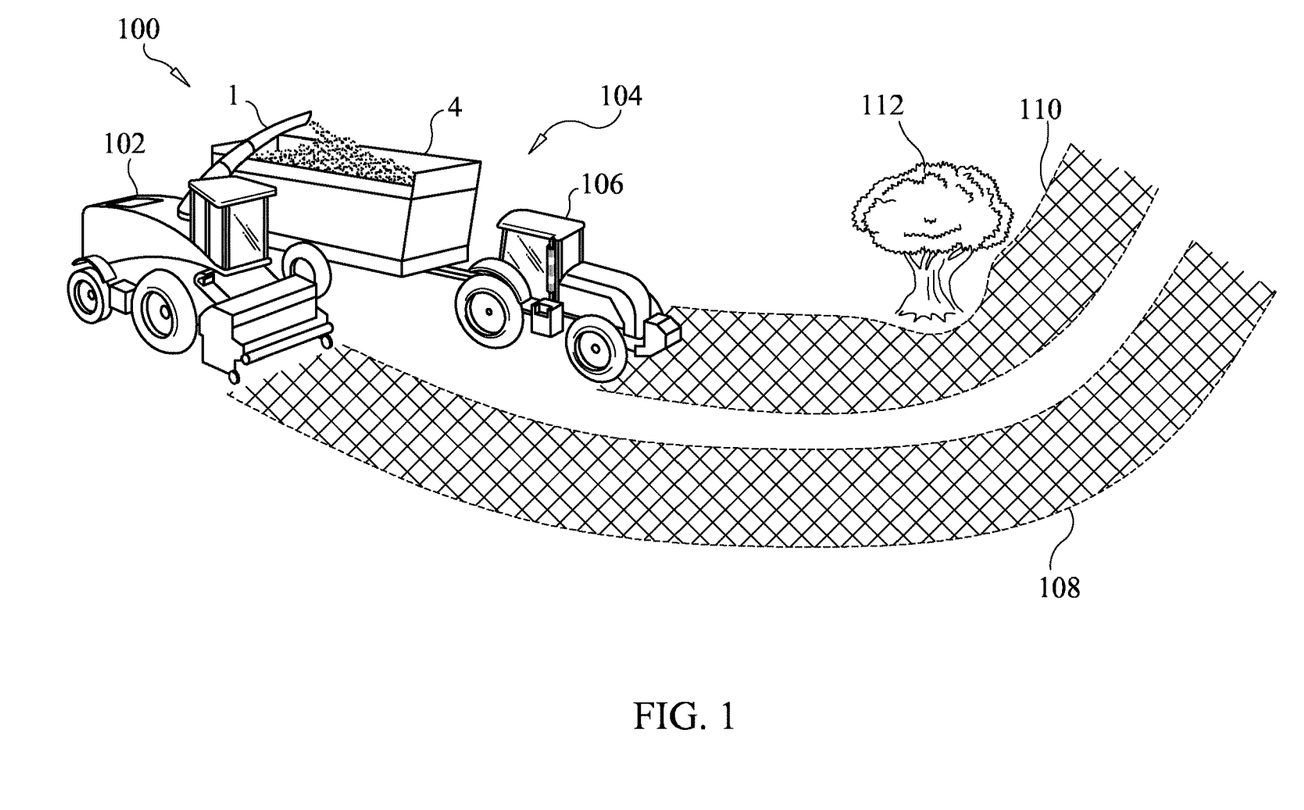
FIG. 1 schematically shows an unloading system.
Figure 2:
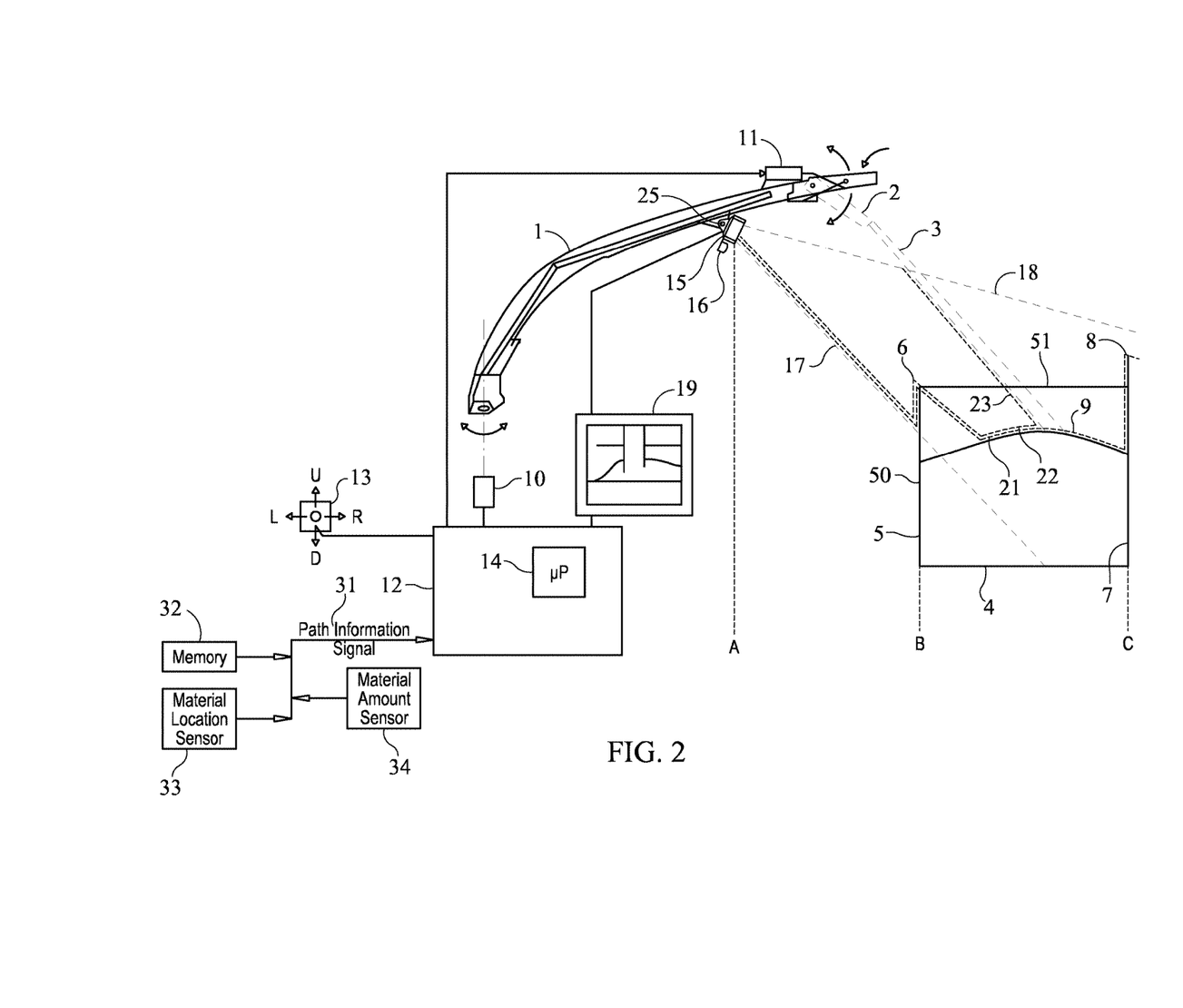
FIG. 2 schematically shows a discharge spout of an agricultural harvesting machine and a container.

FIGS. 1 and 2 are examples of an unloading system in the agricultural industry. It will be appreciated from the description that follows that examples disclosed herein can also be used in other industries, for example in construction.

FIG. 1 shows schematically an unloading system 100. The unloading system 100 comprises an unloading vehicle 102, which in this example is an agricultural harvesting machine such as a forage harvester or a combine harvester. The agricultural harvesting machine 102 has an unloading apparatus 1, which in this example is a discharge spout. Further details of the discharge spout 1 are provided below with reference to FIG. 2. The unloading system 100 also has a collection vehicle 104 having a container 4 for receiving material that has been unloaded by the unloading vehicle 102. In this example, the collection vehicle is a tractor 106 that tows the container 4 and the material is a crop. In other examples the container may be part of the collection vehicle; such a vehicle may be a dump truck. The discharge spout 1 of the agricultural harvesting machine 102 directs crop to the container 4 driven in the vicinity of the agricultural harvesting machine 102. For example, the container 4 may be driven either behind or next to the agricultural harvesting machine.

Also shown in FIG. 1 is the path 108 that the agricultural harvesting machine 108 will follow. This may be a path of swath for collection or corn for harvesting. Also shown in FIG. 1 is a path 110 that is to be followed by the collection vehicle 106, which may take into account any obstacles in the path, such as the tree 112 in FIG. 1.

As will be described below with reference to FIG. 2, the unloading system 100 also includes a controller for setting an attribute of the discharge spout 1 and/or container 4 in accordance with the path 108 that is to be followed by the agricultural harvesting machine 102 and/or the path 110 that is to be followed by the tractor 106.

FIG. 2 shows a schematic image of the container 4 and discharge spout 1 shown in FIG. 1. The discharge spout 1 is an example of a movable unloading apparatus. The base of the discharge spout 1 is mounted for rotation about a vertical axis and pivoting about a horizontal axis on an agricultural harvesting machine (not shown), in a manner known in the art. The discharge spout 1 is used to direct a stream 3 of processed crop material from the agricultural harvesting machine to the container 4. The container 4 and discharge spout 1 are movable relative to each other.

The container 4 has a near wall 5, closest to the agricultural harvesting machine, and an opposite, remote wall 7. The near wall 5 has an upper border/edge 6 and the remote wall 7 also has an upper border/edge 8. Crop material is deposited into the container 4 from the discharge spout 1 and forms a heap 9 therein.

The base of the discharge spout 1 is equipped with an actuator, for example a hydraulic motor 10, for changing the angular position of the discharge spout 1 about the vertical axis. The discharge spout 1 is also equipped with a further actuator, for example a hydraulic cylinder (not shown), for changing the height of the distal end of the discharge spout 1 by controlling the angle of the discharge spout about the horizontal axis. The discharge spout 1 further has a pivotable flap 2 at its distal end, equipped with a third actuator, for example a linear electrical actuator 11, for changing the angle of the pivotable flap 2 about a horizontal axis. The three actuators are controlled by a controller 12 in order to direct the stream 3 of processed crop material into the container 4. The controller 12 may be governed by a manual control 13 or by a microprocessor 14 that implements any known control algorithm such as the one described in WO-A-2011/101458. Such manual control and known control algorithm will be referred to as a main control methodology.

A camera 15 and a light source 16 are mounted on the discharge spout 1, below the pivotable flap 2 as shown in FIG. 2. The camera 15 is configured to produce images 19 as arrays of pixels. The camera 15 may be a 3-D camera that also provides depth data representative of the distance between the camera and objects shown in the image, for each pixel in the image. This depth data may be determined on the basis of the well-known time-of-flight principle. The field of the camera is represented in FIG. 1 by the border lines 17 and 18. The light source 16 is preferably a Near Infra Red (NIR) lamp, which emits modulated light with a certain wavelength. Reflected light of the same wavelength is captured by the camera 15.

The camera 15 is positioned such that it records images 19 that include at least a portion of the container 4, and optionally also the stream of crop material 3 as it passes from the discharge spout 1 to the container 4. The recorded images 19 can be used as part of the main control methodology as is known in the art.

Also shown in FIG. 2 is a path information signal 31 that is provided to the controller 12. The controller 12 can then set an attribute of the discharge spout 1, agricultural harvesting machine, and/or container 4 in accordance with both the image data returned by the camera 15 and the path information signal 31 in order to direct the crop material from the discharge spout 1 to the container 4. In particular, the controller 12 can process the path information signal in order to determine a relative positioning characteristic representative of how the unloading apparatus will move relative to the container as the unloading vehicle or collection vehicle follows the path, and then set the attribute in accordance with both the image data and the relative positioning characteristic.

The path information signal 31 may be representative of the path that is to be followed by the agricultural harvesting machine. For example, the path information signal 31 may be representative of the location of the path, the amount of crop/material on the path and/or any obstacles in the path.

Alternatively or additionally, the path information signal 31 may be representative of the path that is to be followed by the collection vehicle. For example, the path information signal 31 may be representative of the location of the path and/or any obstacles in the path. The controller 12 may determine the path that is to be followed by the collection vehicle using details of the path that is to be followed by the agricultural harvesting machine. For example, as a default the collection vehicle's path may be considered as one that is parallel to the agricultural harvesting machine/s path but offset to either the left or the right. The controller 12 may modify this default path in accordance with any obstacles associated with the default path, as discussed below.

It will be appreciated that the path information signal 31 may be representative of any feature of the path that will affect how crop/material will be unloaded from the discharge spout 1 to the container 4 and/or will affect the speed of the agricultural harvesting machine and/or collection vehicle.

In one example, the path information signal 31 is representative of the location of a predetermined path/route that is to be followed by the unloading system/unloading vehicle. In some examples, the predetermined path is a series of global positioning system (GPS) coordinates, which may have been recorded by a vehicle that laid down the material/swath that is to be collected (such as a swather for grass) or planted the material for collection (such as a seeder for corn). Such predetermined path information may be stored in memory 32 that is accessible by the controller 12. Alternatively, the predetermined path information may be transferred wirelessly to the controller 12 by another vehicle or a control centre.

The controller 12 can take into account any obstacles in the path of the collection vehicle and/or agricultural harvesting machine when determining the path/route. The controller 12 may adjust the location of a path that is identified by the path information signal 31 such that it avoids the obstacles. In turn, this is used by the controller 12 to set an attribute of the discharge spout 1, agricultural harvesting machine, and/or collection vehicle accordingly. For example, if the collection vehicle is expected to drive closer to the agricultural harvesting machine in order to avoid a tree (as shown in FIG. 1), the pivotable flap may be adjusted downwards so that crop is not ejected as far laterally from the discharge spout, or the discharge spout 1 may be moved so that its distal end is closer to the near wall 5 of the container 4. In some examples such relative movement of the discharge spout 1 and container 4 may involve rotating the discharge spout about a vertical axis and/or changing the speed of the agricultural harvesting machine and/or collection vehicle.

Details of any such obstacles may be stored in the memory 32 that is accessible by the controller 12; for example trees that are known to be present in a field that is being harvested. Alternatively, details of such obstacles may be determined in real-time based on image processing of image data returned from a camera having a field of view in front of the agricultural harvesting machine and/or collection vehicle.

The location of the predetermined path information, either as directly provided by the path information signal 31 or following subsequent processing by the controller 12, can optionally be used by the controller 12 to determine the relative positioning characteristic, which is indicative of how the discharge spout 1 is expected to move relative to the container 4 as the agricultural harvesting machine or collection vehicle follows the path. The controller 12 can then use the path information signal 31 or the relative positioning characteristic to set an attribute of the discharge spout 1 and/or container 4 in a number of ways:

It can be used to prepare the unloading system for an upcoming turn in the path by setting the position of the discharge spout 1 relative to the container 4 such that crop material is directed from the unloading apparatus to a different region of the container in advance of the turn. For example, the crop material can be directed more towards the front or the back of the container 4 (or more towards the left or right), relative to the direction of travel of the unloading vehicle, before the turn takes place so that it is less likely that the material ejected by the discharge spout will miss the container 4 during the turn. This can be achieved by rotating the discharge spout 1, accelerating or decelerating the agricultural harvesting machine, and/or accelerating or decelerating the collection vehicle.

Similarly, it can be used to immediately make a counter action for a turn in the path. That is, it can reduce the amount of time required to adjust the relative locations of the discharge spout 1 and the container 4 during a turn.

It can be used to prepare the unloading system for an upcoming obstacle in the path by changing the relative positioning of the discharge spout 1 and the container 4. Again it can reduce the amount of time required to adjust the relative locations of the discharge spout 1 and the container 4 when negotiating the obstacle.

In can be used in combination with mapping information (such as ordnance survey maps that are provided by the national mapping agency of Great Britain) to identify regions of the path that are subject to a significant change in altitude. A significant change in altitude may be one that exceeds a predetermined threshold. The controller 12 can then set the position of the discharge spout 1 relative to the container 4 to account for any likely changes in speed of the agricultural harvesting machine and/or container 4 as it/they travel uphill or downhill along the path. In this way, the path information signal can be considered to be representative of the slope of the predetermined path that is to be followed.

In other examples, a slope sensor can be associated with the agricultural harvesting machine or container 4 such that it provides a slope signal to the controller. The slope signal can be representative of a current slope experienced by the unloading system, and can be utilised by the controller when setting an attribute of the unloading system. In such examples, the path information signal 31 can be considered as optional.

Alternatively, the path information signal 31 may be representative of the location of material that is to be collected. A material location sensor 33 may be provided that can detect the location of the material that is to be collected. The material location sensor 33 may be positioned in front of the agricultural harvesting machine. The material location sensor 33 may be a swath/crop measuring sensor that can identify the location of swath/crop that is to be collected and unloaded by the agricultural harvesting machine. The swath/crop measuring sensor may be a distance measuring device such as an ultrasonic sensor, time-of-flight (TOF) sensor, stereovision camera, or a radar object detection system. Alternatively, the swath/crop measuring sensor could be a normal 2-D camera, and the location of the swath/crop can be detected by image processing the image data returned by the camera. As a further alternative, the swath/crop measuring sensor may be a deflection sensor that is associated with the header of the agricultural harvesting machine, which gathers the crop. Such a deflection sensor can be used for swath guidance, for example if the crop is corn, then the deflection sensor can be used to follow corn rows.

Using the location of material that is to be collected enables the unloading system to be controlled in real-time based on the path that is in front of the unloading vehicle as opposed to a predetermined path. The controller 12 can use this location information in a similar way to that described above. In particular, this mode of operation enables obstacles in the path to be manoeuvred with a reduced amount of material spillage.

It will be appreciated that the path information signal 31 may be representative of a programmed or estimated path that the agricultural harvesting machine is to follow.

As a further alternative, the path information signal 31 may be representative of the amount of material/crop that is to be collected from the path. This may be an amount of crop per unit area and may be referred to as yield for crop that is still standing, which can be considered as a property of a field that is to be harvested, measured in tons/ha. Alternatively, in the case of a swath, the path information signal 31 may be representative of amount of material per (unit of) distance. A material amount sensor 34 may be provided that can detect the amount of material that is to be collected from the path. The material amount sensor 34 may also be positioned in front of the agricultural harvesting machine. The material amount sensor 33 may be a swath/crop measuring sensor as described above, which may be configured to determine the amount of material/crop at different regions of the path that is to be followed. For example, when a swath sensor is used in front of the agricultural harvesting machine, it can measure the area of a vertical cross-section of the swath while driving forward. The controller 12 can then integrate these measured area values over the distance traveled by the agricultural harvesting machine in order to calculate the volume (amount) of material.

The controller 12 can use the path information signal 31 representative of the amount of material/crop that is to be collected to identify any significant changes in the amount of material that is to be unloaded. A significant change in the amount of material may be one that exceeds a predetermined threshold. In one example, the controller 12 can increase the speed of the container 4 in advance of the amount of material that is to be collected reducing, on the assumption that the agricultural harvesting machine will accelerate when there is less material to be collected. Similarly, the controller 12 can decrease the speed of the container 4 in advance of the amount of material that is to be collected increasing. Alternatively or additionally, the controller 12 can prepare the unloading system for the expected change in speed of the agricultural harvesting machine by setting the position of the discharge spout 1 relative to the container 4 such that it is more towards the front or the back of the container 4 before the change in speed takes place. In this way it can be less likely that the material ejected by the discharge spout 1 will miss the container 4 when the agricultural harvester encounters the change in amount of material to be collected.

Furthermore, the prediction of the yield can be used to adapt the rate of change that an attribute of the discharge spout 1 and/or container 4 is adjusted on the basis that a high yield will cause a heap of crop to build up more quickly in the container 4 such that the direction of flow crop should also be adapted more quickly to optimize the filling process.

As discussed above, the path information signal 31 is used by the controller 12 to set an attribute of the discharge spout 1 or container 4 in a predictive way based on the path that is to be followed by the agricultural harvesting machine. For example changes in the relative positioning of the unloading apparatus 1 and container 4 can be predicted and accounted for such that any unnecessary crop spillage is avoided.

The attribute can be one or more of the following:

The angular position of the discharge spout about a vertical axis, for example by controlling the hydraulic motor 10. This may be referred to as spout rotation.

The angular position of the discharge spout about a horizontal axis, for example by controlling the hydraulic cylinder (not shown). This may be referred to as spout elevation.

The angular position of the pivotable flap 2, for example by controlling the linear electrical actuator 11. This may be referred to as flipper angle.

The driving speed or direction of the agricultural harvesting machine, which affects the relative positioning between the associated discharge spout 1 and the container 4.

The driving speed or direction of the collection vehicle, which affects the relative positioning between the associated collection vehicle and the agricultural harvesting machine.

Additionally or alternatively, the rate of change of one or more of the above attributes (and not necessarily the absolute value) can be set in accordance with the path information signal 31. This may be referred to as changing the gain that defines the speed of reaction (controller gain).

The controller 12 can determine a predicted change in unloading characteristics of the unloading system based on the expected change in motion of one or both of the agricultural harvesting machine and container due to the path that is to be followed as determined from the path information signal or relative positioning characteristic. The controller 12 can then automatically control the unloading system in accordance with the predicted change in the unloading characteristics in order to better direct the crop material 3 from the discharge spout 1 to the container 4. This control will be referred to as a predictive control methodology and can be used to supplement the main control methodology in order to reduce crop wastage.

The predictive control methodology may determine an offset value for one or more of the attributes of the discharge spout 1 and/or container 4 in accordance with the path information signal or the relative positioning characteristic. The offset values may be added to the corresponding main values in order to put the discharge spout 1 in a position relative to the container 4 that will be advantageous when the agricultural harvesting machine follows the path.

In one example, the predictive control methodology may be a predictive algorithm that uses the path information signal or the relative positioning characteristic to calculate the offset value. The predictive algorithm may or may not apply a linear function. Alternatively, a database or look-up table can be used by the predictive control methodology to determine the offset value.

In one example, the predictive control methodology may add or subtract a predetermined angle to the main value for the discharge spout's angular position about its vertical axis. It will be appreciated that the size of the predetermined angle will be specific to the dimensions of the apparatus involved.

In the above examples, the unloading apparatus is movable such that an attribute of the unloading apparatus can be set in order to direct the material from the unloading apparatus to the container. It will be appreciated that alternatively or additionally, an attribute of the collection vehicle or agricultural harvesting machine can be set in a similar way in order to set the relative positions of the container 4 and the discharge spout 1. Such an attribute may be the speed or direction of the vehicle, in some examples the speed or direction of the vehicle relative to the speed or direction of the other vehicle. In such examples, the unloading apparatus may be fixed, that is, not movable.

One or more examples disclosed herein can determine and make use of predictive information that is derived from the path that is to be followed by the unloading vehicle or collection vehicle. This can involve determining how an unloading apparatus will move relative to a container as the unloading vehicle or collection vehicle follows the path. Advantageously, the system can then 'react' before the relative position of the unloading apparatus and container changes, thereby reducing crop spillage.

The skilled person will appreciate that one or more of the examples disclosed herein are equally applicable to the construction industry and other industries that have unloading systems.

The invention claimed is:

1. A controller for an unloading system, the unloading system comprising an unloading vehicle having an unloading apparatus and a collection vehicle having a container, wherein the unloading apparatus is configured to direct material to the container driven in the vicinity of the unloading vehicle, the controller is configured to:
   receive image data representative of at least a portion of the container;
   receive a path information signal representative of a path that is to be followed by the unloading vehicle or the collection vehicle and an amount of material per unit area that is to be collected on the path;
   set an attribute of at least one of the unloading apparatus, the unloading vehicle, and the collection vehicle in accordance with the image data and the path information signal in order to direct the material from the unloading apparatus to the container such that the material is directed to a region of the container that is one of further forwards and further backwards;
   process the path information signal in order to determine a relative positioning characteristic representative of how the unloading apparatus is expected to move relative to the container as the unloading vehicle or the collection vehicle follows the path; and
   set an attribute of at least one of the unloading apparatus and the collection vehicle in accordance with the image data and the determined relative positioning characteristic.

2. The controller according to claim 1, wherein the path information signal is representative of a location of a predetermined path that is to be followed by the unloading vehicle or the collection vehicle.

3. The controller according to claim 2, wherein the predetermined path comprises a series of GPS coordinates.

4. The controller according to claim 1, wherein the path information signal is further representative of a location of material that is to be collected by the unloading vehicle.

5. The controller according to claim 1, wherein the path information signal comprises an indication of an upcoming turn, and the controller is further configured to direct the material from the unloading apparatus to a different region of the container in advance of the turn.

6. The controller according to claim 5, further configured to direct the material from the unloading apparatus to the region of the container that is either further forwards or backwards in advance of the turn.

7. The controller according to claim 1, wherein the path information signal is further representative of the slope of a predetermined path that is to be followed by the unloading vehicle.

8. The controller according to claim 1, wherein the image data comprises 3-dimensional image data.

9. A controller for an unloading system, the unloading system comprising an unloading vehicle having an unloading apparatus and a collection vehicle having a container, wherein the unloading apparatus is configured to direct material to the container driven in the vicinity of the unloading vehicle, the controller is configured to:
  receive image data representative of at least a portion of the container;
  receive a path information signal representative of a path that is to be followed by the unloading vehicle or the collection vehicle;
  set an attribute of at least one the unloading apparatus, the unloading vehicle, and the collection vehicle in accordance with the image data and the path information signal in order to direct the material from the unloading apparatus to the container;
  wherein the path information signal is further representative of the amount of material per unit area that is to be collected;
  increase a speed of the container or set the attribute of the unloading apparatus in order to direct the material from the unloading apparatus to a region of the container that is further forward, if the path information signal is indicative of a reducing amount of material that is to be collected, and
  decrease the speed of the container or set the attribute of the unloading apparatus in order to direct the material from the unloading apparatus to a region of the container that is further backwards, if the path information signal is indicative of an increasing amount of material that is to be collected.

10. An unloading system comprising:
  an unloading apparatus for directing material toward a collection vehicle having a container;
  a material amount sensor configured to detect an amount of material that is to be collected;
  a controller operatively connected to the unloading apparatus, the controller configured to:
    receive image data representative of at least a portion of the container;
    receive a path information signal representative of a path that is to be followed by the unloading vehicle or the collection vehicle and the amount of material that is to be collected on the path; and
    set an attribute of at least one of the unloading apparatus, the unloading vehicle, and the collection vehicle in accordance with the image data and the path information signal in order to direct the material from the unloading apparatus to the container such that the material is directed to a region of the container that is one of further forwards and further backwards;
    process the path information signal in order to determine a relative positioning characteristic representative of how the unloading apparatus is expected to move relative to the container as the unloading vehicle or the collection vehicle follows the path; and
    set an attribute of at least one of the unloading apparatus and the collection vehicle in accordance with the image data and the determined relative positioning characteristic.

11. The unloading system of claim 10, further comprising:
  at least one of a material location sensor configured to detect a location of material that is to be collected in order to provide the path information signal.

12. A method of controlling an unloading system, the unloading system comprising an unloading vehicle having an unloading apparatus and a collection vehicle having a container, wherein the container is driven in the vicinity of the unloading vehicle, the method comprising steps of:
  receiving image data representative of at least a portion of the container;
  receiving a path information signal representative of a path that is to be followed by the unloading vehicle or the collection vehicle; and
  setting an attribute of at least one of the unloading apparatus, the unloading vehicle, and the collection vehicle in accordance with the image data and the path information signal;
  increasing a speed of the container or setting the attribute of the unloading apparatus in order to direct the material from the unloading apparatus to a region of the container that is further forwards, if the path information signal is indicative of a reducing amount of material that is to be collected, and
  decreasing the speed of the container or setting the attribute of the unloading apparatus in order to direct the material from the unloading apparatus to a region of the container that is further backwards, if the path information signal is indicative of an increasing amount of material that is to be collected.

13. The method of claim 12, further comprising steps of:
  processing the path information signal in order to determine a relative positioning characteristic representative of how the unloading apparatus is expected to move relative to the container as the unloading vehicle or the collection vehicle follows the path; and
  setting an attribute of the unloading apparatus, the unloading vehicle, or the collection vehicle in accordance with the image data and the relative positioning characteristic.

14. The method of claim 12, further comprising a step of:
  directing the material from the unloading apparatus to a region of the container that is either further forwards or backwards in advance of the turn.

15. A computer program stored on a non transitory computer-readable medium, the computer program, when executed by a computer, is configured to cause the computer to perform steps of:
  receiving image data representative of at least a portion of the container;
  receiving a path information signal representative of a path that is to be followed by the unloading vehicle or the collection vehicle; and
  setting an attribute of the unloading apparatus, the unloading vehicle, or the collection vehicle in accordance with the image data and the path information signal;
  wherein the computer program, when executed by the computer, is further configured to cause the computer to perform steps of:
  increasing a speed of the container or setting the attribute of the unloading apparatus in order to direct the material from the unloading apparatus to a region of the container that is further forwards, if the path information signal is indicative of a reducing amount of material that is to be collected, and
  decreasing the speed of the container or setting the attribute of the unloading apparatus in order to direct the material from the unloading apparatus to a region of the container that is further backwards, if the path information signal is indicative of an increasing amount of material that is to be collected.

16. The computer program of claim 15, wherein the computer program, when executed by the computer, is further configured to cause the computer to perform steps of:
- processing the path information signal in order to determine a relative positioning characteristic representative of how the unloading apparatus is expected to move relative to the container as the unloading vehicle or the collection vehicle follows the path; and
- setting an attribute of the unloading apparatus, the unloading vehicle, or the collection vehicle in accordance with the image data and the relative positioning characteristic.

* * * * *